June 16, 1959     C. A. E. OLDHAM     2,890,918
PUMP PISTONS
Filed June 28, 1957
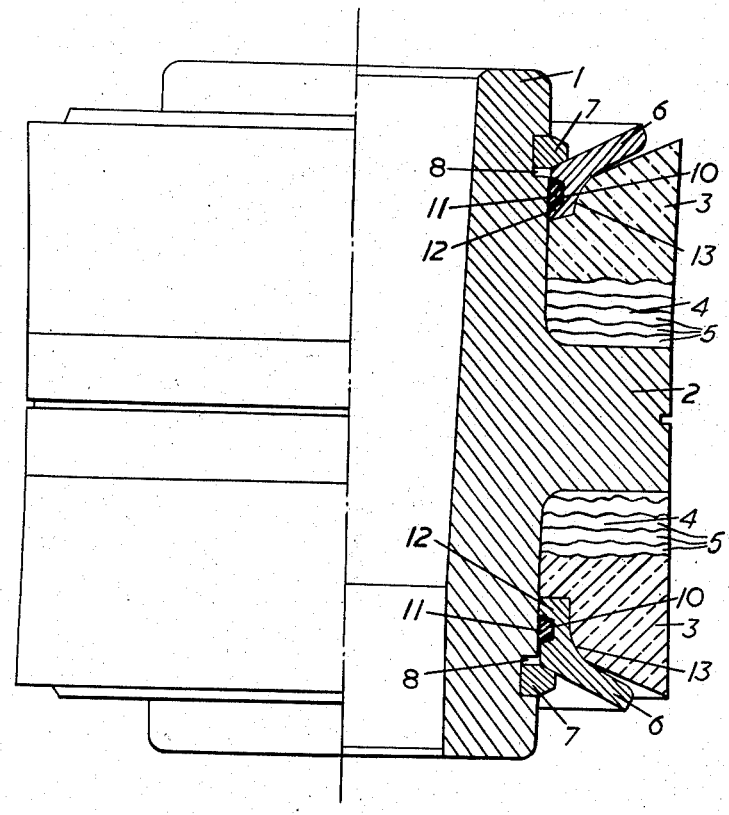
INVENTOR
CHARLES A. E. OLDHAM United States Patent Office 2,890,918
Patented June 16, 1959

2,890,918
PUMP PISTONS

Charles Albert Edward Oldham, London, England

Application June 28, 1957, Serial No. 668,806

Claims priority, application Great Britain April 24, 1957

3 Claims. (Cl. 309—4)

This invention has reference to improvements in and relating to pistons used in pumps which have to deal with abrasive-laden liquids such as mud and slurry encountered in connection with oil drilling, liquid cement and the like, said piston being of the type comprising a renewable rubber or renewable rubbers of hollow cylindrical form on a core which enters the bore of the rubber or rubbers.

When the known pistons are in use abrasive seeps between the inner periphery of the rubber or rubbers and the core, wears the inner periphery or inner peripheries and frequently corrodes or erodes the core. These actions of the abrasive become progressively more damaging as the piston is used because, apart from the internal wear of the rubber or rubbers, the normal wear at the outer periphery of the rubber or rubbers enables the inner periphery or peripheries of the rubber or rubbers to expand and a geater quantity of fluid enters the rubber or rubbers.

The principal object of the present invention is the provision of a piston as first set forth herein where the entry of liquid into the bore of the rubber or rubbers is prevented, at least for a considerably longer period than is the case in the known pistons of the type with which the invention is concerned.

According to the invention that end of the rubber or rubbers exposed to fluid when the piston is in use is provided with a gland containing a packing or sealing ring surrounding the said core, thereby preventing fluid from entering the bore or bores.

The piston is preferably of the type provided with a locking plate at that end of the rubber or rubbers exposed to fluid when the piston is in use, and in accordance with a further feature of the invention the locking plate or plates is bossed centrally, said boss having a circular bore coaxial with the piston core, and the bore of the boss is annularly grooved, the packing or sealing ring being located in said groove and the boss being located in a recess in the rubber. The boss is a tight fit in the rubber and may be united to it by bonding, vulcanising or cementing.

One example of construction of a double acting piston according to the invention is shown in the accompanying drawing which is a sectional elevation.

The piston comprises a hollow cylindrical core 1 which is centrally flanged at 2, two hollow cylindrical rubbers 3, 3 near the ends of the core having cylindrical blocks 4 of reinforced abrasive-resisting fabric 5 abutting the flange. Locking plates 6 releaseably held in place by spring clips 7 taking into grooves 8 near the extremities of the core removably hold the rubbers 3 in position on the core.

In accordance with the invention the rubbers are provided at their outer ends, i.e., the ends which are exposed to fluid when the piston is in use, with glands 10 containing sealing rings 11 of rubber or the like surrounding the core so as to make sealing engagement therewith. In the constructional example shown the glands are provided by centrally bossing the plates 6 at 12, said bosses being hollow, and annularly grooving the bores of the bosses to provide the gland recesses in which the rings 11 are located.

The bosses tightly enter recesses 13 in the ends of the rubbers 3 to which they are adjacent.

When the piston is in use the locking plates are alternately pressed hard against the rubbers (the flange 2 providing the counter-thrust) so the recesses 13 are sealed off from the fluid under pressure in the working chambers of the pump cylinder; and the sealing rings 11 prevent the liquid from passing into the bores of the rubbers by way of the bores of the bosses. Hence the bores of the rubbers are isolated from the said fluid.

It will be evident that a single acting piston comprises one of the rubbers and a block 4 on a flanged core like that shown with the core part not surrounded by a rubber and block foreshortened if desired and without a locking plate and spring ring.

What I claim is:

1. A pump piston comprising a cylindrical core for connection to a piston rod, said core having an external flange located between its ends, two cylindrical rubber rings respectively surrounding said core at each end thereof and abutting said flange, locking plates respectively surrounding said core at those ends of the rubber rings furthest from the flange, said locking plates having hollow bosses surrounding the core and said ends of said rubber rings having recesses snugly receiving the bosses, each of said bosses having an internal groove, and packing rings located in said grooves and embracing said core.

2. A pump piston as claimed in claim 1 wherein the bosses are united to the walls of their respective recesses.

3. A pump piston comprising a cylindrical core for connection to a piston rod and having an external flange, a cylindrical rubber ring surrounding said core and abutting said flange, a locking plate surrounding said core at the end of the rubber ring furthest from the flange, said locking plate having a hollow boss surrounding the core and said end of said rubber ring having a recess snugly receiving the boss, said boss having an internal groove, and a packing ring located in said groove and embracing said core.

References Cited in the file of this patent

UNITED STATES PATENTS 2,431,653   Volpin _____ Nov. 25, 1947
2,596,703   Maier _____ May 13, 1952